(12) United States Patent
Abraham et al.

(10) Patent No.: US 11,733,905 B1
(45) Date of Patent: *Aug. 22, 2023

(54) DATA WAREHOUSE BATCH ISOLATION WITH ROLLBACK AND ROLL FORWARD CAPABILITY

(71) Applicant: Massachusetts Mutual Life Insurance Company, Springfield, MA (US)

(72) Inventors: Israel Abraham, Springfield, MA (US); Suresh Babu Punna, Springfield, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,025

(22) Filed: Jul. 11, 2022

Related U.S. Application Data

(63) Continuation of application No. 16/838,871, filed on Apr. 2, 2020, now Pat. No. 11,385,821.

(51) Int. Cl.
*G06F 3/06* (2006.01)
*G06F 7/14* (2006.01)

(52) U.S. Cl.
CPC .......... *G06F 3/0647* (2013.01); *G06F 3/0604* (2013.01); *G06F 3/067* (2013.01); *G06F 7/14* (2013.01)

(58) Field of Classification Search
CPC ........ G06F 7/14; G06F 3/0647; G06F 3/0604; G06F 3/067
See application file for complete search history.

(56) References Cited

U.S. PATENT DOCUMENTS

| | | | |
|---|---|---|---|
| 2006/0069628 A1 | 3/2006 | Le et al. | |
| 2010/0223231 A1 | 9/2010 | Lee | |
| 2014/0310232 A1 | 10/2014 | Plattner et al. | |
| 2015/0026127 A1* | 1/2015 | Zachrisen | G06F 16/2365 707/634 |
| 2017/0364563 A1 | 12/2017 | Gao et al. | |
| 2019/0384847 A1 | 12/2019 | Bobbala et al. | |
| 2020/0218507 A1* | 7/2020 | Nakagawa | G06F 7/14 |

\* cited by examiner

*Primary Examiner* — Ryan Bertram
(74) *Attorney, Agent, or Firm* — Foley & Lardner LLP

(57) ABSTRACT

Methods and systems disclosed herein allow data to be transferred from a data source to a target database with little to no offline period or data corruptions. The methods and systems describe a server that generates a temporary data repository having a similar configuration as the target data repository; transmits the set of new data records from the data source to the temporary data repository; identifies dependency relationship attributes among the data records stored within the target data repository; and when the server identifies that a predetermined number of data records and their respective dependent data records are stored within the temporary data records, the server merges the set of data records and the set of new data records. The server also stores a pre/post merger record of data such that the server can revert to a previous version of data or roll forward to another version.

20 Claims, 5 Drawing Sheets

400

Work table for Batch 5 — 402

| PK | Field1 | AUDIT_ID | UPDATE_AUDIT_ID |
|---|---|---|---|
| pk1 | 10000 |  | 5 |
| pk5 | 2000 |  | 5 |
| pk6 | 6000 |  | 5 |

Batch 4's Target table before Batch 5 Update — 404

| PK | Field1 | AUDIT_ID | UPDATE_AUDIT_ID |
|---|---|---|---|
| pk1 | 100 |  | 3 |
| pk2 | 1000 |  | 2 |
| pk3 | 300 |  | 1 |
| pk4 | 400 |  | 1 |
| pk5 | 500 |  | 1 |

Target table After Batch 5 Update — 406

| PK | Field1 | AUDIT_ID | UPDATE_AUDIT_ID |
|---|---|---|---|
| pk1 | 10000 |  | 3 |
| pk2 | 1000 |  | 2 |
| pk3 | 300 |  | 1 |
| pk4 | 400 |  | 1 |
| pk5 | 2000 |  | 5 |
| pk6 | 6000 |  | 5 |

Delta table for later recovery from batch5 to batch4 — 408

| PK | Field1 | AUDIT_ID | UPDATE_AUDIT_ID |
|---|---|---|---|
| pk1 | 100 |  | 3 |
| pk5 | 500 |  | 1 |

| PK | restricted_row_ind | AUDIT_ID | UPDATE_AUDIT_ID |
|---|---|---|---|
| pk3 | | Y | 5 | 5 |
| pk4 | | Y | 5 | 5 |
| pk5 | | N | 5 | 5 |

504

| PK | restricted_row_ind | AUDIT_ID | UPDATE_AUDIT_ID |
|---|---|---|---|
| Pk1 | | N | 1 | 1 |
| Pk2 | | N | 2 | 2 |
| Pk3 | | N | 3 | 3 |
| Pk4 | | N | 4 | 4 |

506

| PK | restricted_row_ind | AUDIT_ID | UPDATE_AUDIT_ID |
|---|---|---|---|
| Pk1 | | N | 1 | 1 |
| Pk2 | | N | 2 | 2 |
| Pk3 | | Y | 3 | 5 |
| Pk4 | | Y | 4 | 5 |
| Pk5 | | N | 5 | 5 |

Delta table for later recovery from batch5 to batch4

508

| PK | restricted_row_ind | UPDATE_AUIT_ID |
|---|---|---|
| pk3 | N | 3 |
| pk4 | N | 4 |

FIG. 5

DATA WAREHOUSE BATCH ISOLATION WITH ROLLBACK AND ROLL FORWARD CAPABILITY

CROSS-REFERENCE TO RELATED APPLICATIONS

The present application is a continuation application of U.S. application Ser. No. 16/838,871, filed Apr. 2, 2020, which is incorporated by reference herein in its entirety for all purposes.

TECHNICAL FIELD

The subject matter described herein relates generally to database management systems, and more specifically directed towards systems and methods for transfer of data records.

BACKGROUND

A data repository (e.g., a database of a company) may store different types of data records that may be used by different servers/computers to analyze and/or generate reports. These reports may be directly consumed by users, such as via dashboards updated to show account information and similar information. The data repository may receive the data records from different electronic data sources, which may (directly or indirectly) generate the data records.

Conventionally, when the data records are being transferred from the data sources to the database (e.g., database being updated), user devices are no longer permitted to access the database. Conventional methods require a system administrator to designate the data repository as "off line" before all data is updated. During the offline period, the data repository denies access to user devices because there may be potential data degradation or corruption. Furthermore, some data records may be linked and related to other data records. Conventionally, the system administrator may not allow any access to the database being updated until and unless all interrelated data records are updated. The requirement of having an off line period is highly undesirable and creates negative user experiences because it creates service disruptions.

Conventional data transfer methods also suffer from data integrity issues. In order to combat the above-described technical shortcomings, some conventional data transfer methods have minimized the offline period. However, when conventional methods continue to provide access to users, while the data is being updated, users may experience incomplete/corrupt data, which would cause data integrity issues.

Conventional data transfer solutions also suffer from another technical shortcoming. If the transferred data is corrupt, conventional solutions require the system administrator to designate the data repository as offline and revert the data transfer, such that the data repository includes data before the transfer. While this method solves the data corruption problem, it is highly undesirable because it requires the data repository to be offline.

SUMMARY

For the aforementioned reasons, there is a desire for a database management system, method, and software solution to minimize (if not completely eliminate) the requirement for the data repository to be offline when the data is being transferred and/or when the data is identified as corrupted. There is also a desire to combat data integrity issues described above and allow longer online periods to more data availability.

There is also a desire for a database management system where a user device may be able to access a database to use old data records stored in the database while new data records from a data source are being uploaded. The database management system may include a server, which may implement a data transfer process where the data accessed by the user devices are not corrupted and represent the latest usable version of data. Accordingly, the disclosed database management system is configured such that there is little to no downtime for the user device to access the database and the user device is able to access content within the database at all times.

The methods and systems described herein allow minimizing the offline requirement of conventional data transfer methods/systems. Furthermore, the methods and systems described herein ensure that, even if the data transfer process is not corrupted, providing access to users while new data records from data source are being uploaded avoids data integrity issues described above. Therefore, even if the data is being used while being transferred (e.g., without an offline period), the methods and systems described herein ensure that the data is not corrupted. As will be described below, data may be transferred into the target data repository based on its respective dependencies.

In an embodiment, a server-implemented method for incremental data transfer from a data source to a target data repository comprises periodically receiving, by a server from the data source, a set of new data records for transmission to the target data repository, wherein the target data repository comprises a set of data records; generating, by the server, a temporary data repository, wherein the temporary data repository has a similar configuration as the target data repository; periodically transmitting, by the server, the set of new data records from the data source to the temporary data repository; identifying, by the server, one or more dependency relationship attributes among a plurality of data records within the set of data records stored within the target data repository, the one or more dependency relationship attributes indicating that the plurality of data records are dependent on each other; and when the server identifies that a predetermined number of data records and their respective dependent data records are stored within the temporary data records, merging, by the server, the set of data records and the set of new data records.

In another embodiment, a system for incremental data transfer from a data source to a target data repository comprises a data source configured to transmit a set of new data records; a system repository configured to receive and store the set of new data records; a server in communication with the data source and the system repository, the server configured to: periodically receive from the data source, a set of new data records for transmission to the target data repository, wherein the target data repository comprises a set of data records; generate a temporary data repository, wherein the temporary data repository has a similar configuration as the target data repository; periodically transmit the set of new data records from the data source to the temporary data repository; identify one or more dependency relationship attributes among a plurality of data records within the set of data records stored within the target data repository, the one or more dependency relationship attributes indicating that the plurality of data records are dependent on each other; and when the server identifies that a predetermined number of data records and their respective dependent data records are stored within the temporary data records, merge the set of data records and the set of new data records.

In another embodiment, a server-implemented method comprises periodically merging, by a server, a set of new data records by transmitting the set of new data records from a data source to a target data repository, wherein the target data repository comprises a set of data records; for each time the server merges the set of new data records and the set of data records in the target data repository generating, by the server, one or more files, wherein each file comprises a data table comprising a list of merged data records and their corresponding pre-merged data records, and one or more dependency relationship attributes indicating a plurality of data records within the set of new data records dependent on each other; storing, by the server in a second data repository, the one or more files, wherein the one or more files comprises information associated with an indication of a time of the merging of the set of new data records and the set of data records in the target data repository; receiving, by the server from a user device, a request to identify a first data record within the target data repository prior to the merger of the set of new data records and the set of data records in the target data repository; identifying, by the server, a file from the one or more files corresponding to the request within the second data repository; determining, by the server using the identified file, the first data record within the pre-merged data associated with request; and merging the pre-merged data records with the target data repository by transmitting, by the server to the user device, the first data record associated with the request.

It is to be understood that both the foregoing general description and the following detailed description are exemplary and explanatory and are intended to provide further explanation of the subject matter as claimed.

BRIEF DESCRIPTION OF THE DRAWINGS

The accompanying drawings constitute a part of this specification and illustrate embodiments that, together with the specification, explain the subject matter.

FIG. 4 shows various data tables used to transfer data, according to an embodiment.

FIG. 5 shows various data tables used to transfer data, according to an embodiment.

DETAILED DESCRIPTION

Figure 1:
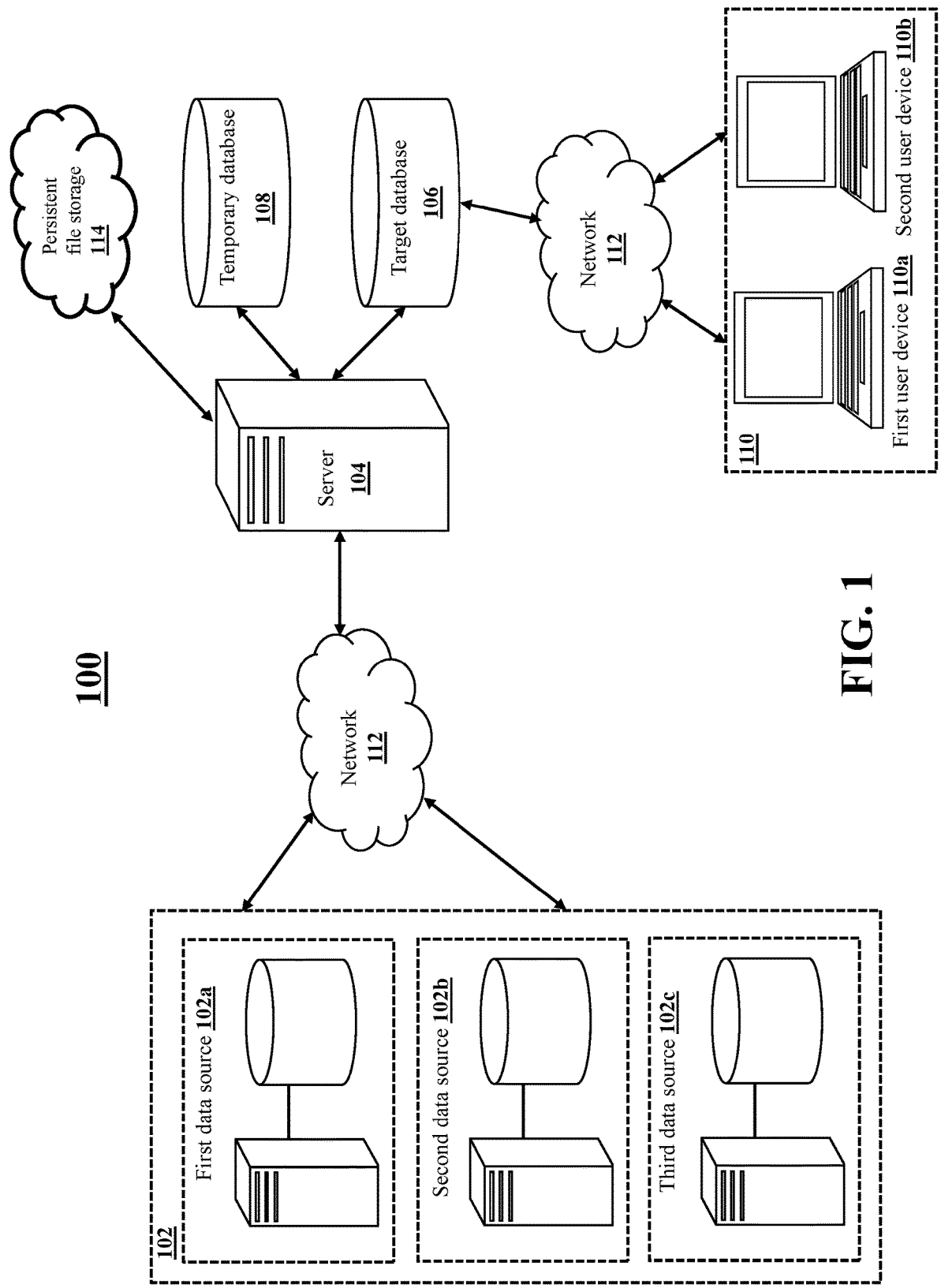
FIG. 1 shows various components of a system for transfer of data from data sources to target databases, according to an embodiment.

Reference will now be made to the embodiments in the drawings, and specific language will be used here to describe the same. It will nevertheless be understood that no limitation of the scope of the claims or this disclosure is thereby intended. Alterations and further modifications of the features explained herein, and additional applications of the principles of the subject matter explained herein, which would occur to one skilled in the relevant art and having possession of this disclosure, are to be considered within the scope of the subject matter disclosed herein. The present disclosure is here described in detail with reference to embodiments explained in the drawings, which form a part here. Other embodiments may be used and/or other changes may be made without departing from the spirit or scope of the present disclosure. The embodiments described in the detailed description are not meant to be limiting of the subject matter presented here.

FIG. 1 shows various components of a system 100. The system 100 may be a database management system employed by a company to periodically update data stored within the company's data repositories. The system 100 may include data sources 102a-c (collectively data sources 102), a server 104, a target database 106, a temporary database 108, a persistent file storage 114, and user devices 110. The data sources 102 may include, but not limited to, a first data source 102a, a second data source 102b, and a third data source 102c. The user devices 110 may include, but not limited to, a first user device 110a and a second user device 110b.

The data sources 102, the server 104, the target database 106, the temporary database 108, and the user devices 110 may be connected to each other and communicate via a network 112. The network 112 may include, but is not limited to, private or public local area network, wireless local area network, metropolitan area network, wide-area network, and the Internet. The network 112 may further include both wired and wireless communications, according to one or more standards, via one or more transport mediums. The communication over the network 112 may be performed in accordance with various communication protocols, such as, transmission control protocol and internet protocol, user datagram protocol, and institute of electrical and electronics engineers communication protocols. The network 112 may further include wireless communications, according to Bluetooth specification sets, or another standard or proprietary wireless communication protocol. The network 112 may further include communications over a cellular network, including, for example, a global system for mobile communications, code division multiple access, and enhanced data for global evolution network.

The system 100 may operate in a local computing environment where the server 104 may receive and execute a request. The request may be to update one or more data tables of the target database 106 with new data records generated by the data sources 102. The data sources 102, the one or more data tables of the target database 106, and software programs (for example, a machine learning algorithm) associated with the server 104 may be stored and executed on local computing resources. The server 104 may locally query the data sources 102 to retrieve the new data records associated with the request. The server 104 may initially transmit the new data records associated with the request to one or more data tables of the temporary database 108. The server 104 may execute a software algorithm to merge the new data records present within the one or more data tables of the temporary database 108 and old data records present within the one or more data tables of the target database 106 to update the one or more data tables in the target database 106 with the new data records obtained from the data sources 102.

The one or more data tables of the target database 106 may be one or more multidimensional data tables, which may store all data records (for example, the old and new data records). The data records within the one or more data tables of the target database 106 may be organized, summarized, consolidated, categorized, and synthesized according to multiple dimensions to reflect the multidimensional nature of the data records. The user devices 110 may directly or indirectly access the target database 106 at any time to retrieve the data records. The user devices 110 may process the data records to generate reports. The reports may be dynamic such that information within the reports may be updated when underlying data records within the reports are changed in the one or more data tables of the target database 106. The reports may be presented on an interactive graphical user interface of the user devices 110.

The system 100 may be implemented in a cloud-computing environment where various devices of the system 100 may be cloud-optimized. The cloud computing described herein may be a model for enabling convenient, on-demand network access to a shared pool of configurable computing resources (e.g., networks, processors, storage, applications, and services) that can be rapidly provisioned and released with minimal management effort or service provider interaction. The cloud-computing environment may provide computation, software, data access, and storage services that do not require end-user knowledge of the physical location and configuration of the system 100 that delivers the services. The cloud-computing infrastructure may be delivered through common centers, built-on servers, and memory resource. In this embodiment, all or some of system the 100 may be implemented in a cloud infrastructure environment. For example, the data sources 102 and the one or more data tables of the target database 106 may reside in a cloud environment. Likewise, the server 104 and the network 112 may all reside in a cloud-computing environment, where resources are allocated on an as needed basis. The data sources 102, the one or more data tables of the target database 106, and application programs may be stored and executed on a remote cloud-based server 104 accessed over a network cloud.

Data sources 102 may include information (for example, new data records) derived from external and secondary data servers, such as bank servers, insurance company servers, stock exchange servers, financial company servers, fraud detection company servers, social media company websites, social media company servers, third party data providers, and any suitable external source required for the proper functioning of the system 100. The external and secondary data servers may generate the new data records. The external and secondary data servers may periodically feed the new data records into the data sources 102. The external and secondary data servers may feed the new data records into the data sources 102 only in response to receiving an electronic request from a processor associated with the data sources 102.

The data sources 102 may be associated with multiple financial application servers. The financial application servers may execute various financial software to generate the new data records. Each new data record may have a prescribed data model associated with a particular financial application. The data sources 102 may include a data repository containing the new data records stored in an electronic format on one or more financial application servers, or other non-transitory machine-readable storage media. In one example, each data source 102 may include a data server (for instance, a financial application server) and a source database (for instance, a data repository). The data server and the source database may communicate with each other over the network 112. The data server and the source database may communicate with the external and secondary data servers over the network 112. The data server and the source database may communicate the new data records to the server 104 over the network 112.

The data server of each data source 102 may include one or more processors. The processors of the data server of each data source 102 may receive the new data records from the external and secondary data servers. The processors of the data server of each data source 102 may process the new data records received from the external and secondary data servers. The processors of the data server of each data source 102 may generate the new data records. The new data records may be log files having a machine-readable code containing various data fields describing sources of data. The processors of the data server of each data source 102 may generate the new data records according to a source data model associated with a particular format and a particular data type. In one example, a first processor of a first data server of a particular data source 102 may generate investment data records in accordance with particular financial data (U.S. dollars) and a format associated with US stock exchange data format. In another example, a second processor of a second data server of a particular data source 102 may generate investment data records in accordance with particular financial data (Canadian dollars) and a format associated with Canada stock exchange data format. Each data server may store the new data records and the processed new data records in the corresponding source database. The source database may include one or more sub-databases. The one or more sub-databases may store the new data records received from the data server as well as the new data records received from the external and secondary data servers. Each data source 102 may transmit the new data records to the target database 106, via the server 104 and the temporary database 108, in a number of ways.

The data sources 102 may include the first data source 102a, the second data source 102b, and the third data source 102c. The first data source 102a may be user bank records data source. The first data source 102a may be associated with a bank. The first data source 102a may include a first data server and a first database. The first data server may generate the new data records such as various bank data records based on banking activity of customers. The first data server may obtain various bank data records of the customers from external and secondary banking servers. The first data server may store the bank data records in the first database. The first data server may transmit the bank data records stored in the first database to the one or more data tables of the target database 106, via the server 104 and the one or more data tables of the temporary database 108. In another embodiment, the server 104 may retrieve the bank data records from the first database of the first data source 102a and transmit the bank data records to the one or more data tables of the target database 106 via the one or more data tables of the temporary database 108.

The second data source 102b may be user insurance records data source. The second data source 102b may be associated with an insurance company. The second data source 102b may include a second data server and a second database. The second data server may generate the new data records such as various insurance data records based on insurance activity of customers. The second data server may obtain various insurance data records of the customers from external and secondary insurance servers. The second data server may store the insurance data records in the second database. The second data server may transmit the insurance data records stored in the second database to the one or more data tables of the target database 106, via the server 104 and the one or more data tables of the temporary database 108.

In another embodiment, the server 104 may retrieve the insurance data records from the second database of the second data source 102b and transmit the insurance data records to the one or more data tables of the target database 106 via the one or more data tables of the temporary database 108.

The third data source 102c may be user personal and fraud records data source. The third data source 102c may be associated with a fraud company. The third data source 102c may include a third data server and a third database. The third data server may generate the new data records such as various fraud history data records based on fraud activity of customers. The third data server may obtain various fraud history data records of the customers from external and secondary fraud monitors servers. The third data server may store the fraud history data records in the third database. The third data server may transmit the fraud history data records stored in the third database to the one or more data tables of the target database 106, via the server 104 and the one or more data tables of the temporary database 108. In another embodiment, the server 104 may retrieve the fraud history data records from the third database of the third data source 102c and transmit the fraud history data records to the one or more data tables of the target database 106 via the one or more data tables of the temporary database 108. Each data table of the target database 106 and the temporary database 108 may include one or more data columns.

A server 104 is a computing device. The server 104 may include a processing unit, and a non-transitory machine-readable storage medium. The processing unit may include a processor with a computer-readable medium, such as a random access memory coupled to the processor. The server 104 may be executing algorithms or computer executable program instructions, which may be executed by a single processor or multiple processors in a distributed configuration. The server 104 may be configured to interact with one or more software modules of a same or different type operating within the system 100.

Non-limiting examples of the processor may include a microprocessor, an application specific integrated circuit, and a field programmable object array, among others. The server 104 may be capable of executing data processing tasks, data analysis tasks, and data transfer tasks. Non-limiting examples of the server 104 may include a desktop computer, a server computer, a laptop computer, a tablet computer, and the like. For ease of explanation, the FIG. 1 shows a single server-computing device functioning as the server 104. However, some embodiments may include a plurality of server computing devices capable of performing the tasks described herein.

The server 104 may retrieve the new data records from the data sources 102. In some embodiments, the server 104 may receive the new data records from the data sources 102. The server 104 may execute one or more software modules (e.g., APIs, web hooks, and web sprockets) to consume (e.g., retrieve/pull, receive) the new data records from the data sources 102. The one or more software modules may be configured to receive or pull the new data records from particular data sources 102, as required by the particular data sources 102. In some cases, a data source 102 may be configured to transmit the new data records to the server 104 at regular interval, using a data transfer protocol.

The server 104 may generate a notification upon obtaining the new data records from the data sources 102. The server 104 may transmit the notification to an admin computing device. The notification may include an electronic message containing information associated with a date and a time of receipt of the new data records. The electronic message may further include information associated with a number of the new data records. The server 104 may store the notifications in a local memory. The local memory may be a part of the server 104.

The server 104 may generate the temporary database 108, which may be a replica (e.g., having the same configurations as the) of the target database 106. The temporary database 108 may include a temporary repository, which may include one or more data tables. Each data table may include one or more data columns. The temporary database 108 may have a same configuration as of the target database 106, however the temporary database 108 may not include data records (for example, old data records) present within the target database 106 prior to data transfer process. The temporary database 108 may include same number of data tables as present within the target database 106. Each data table of the temporary database 108 may have a size similar to the size of the corresponding data table within the target database 106. In addition, both the target database 106 and the temporary database 108 may have same type of data tables.

The server 104 may communicate with the temporary database 108 to continually or periodically populate the one or more data tables of the temporary database 108 with the new data records obtained from the data sources 102. The server 104 may execute a mapping algorithm, which may enable automatic mapping of the new data records from the data sources 102 into corresponding data tables of the temporary database 108. The mapping algorithms may transform and summarize the new data records, prior to populating the data tables of the temporary database 108 with the new data records, in accordance with one or more dimensions (for example, name, field, etc.) of the data tables of the temporary database 108.

The persistent file storage 114 may be a secondary data repository utilized to roll the data forward and/or back. For instance, as will be described below, pre-merged/pre-image of data prior to applying the data transformations may be loaded onto the persistent file storage 114. In some configurations, the persistent file storage can be a loud application or any other third-party temporary data repository. In some embodiments, the temporary database 108 may be used instead or in conjunction with the persistent filed storage.

The server 104 may load the data tables of the temporary database 108 with the new data records obtained from the data sources 102. The data tables of the temporary database 108 may be structured to match a structure of the incoming new data records. Prior to loading the new data records into the data tables of the temporary database 108, or when the new data records may be loaded into the data tables of the temporary database 108, the server 104 may process the new data records. The server 104 may execute one or more processing algorithms on portions or all of the new data records to format and clean the new data records received from the data sources 102. The processing of the new data records may include identification of data field entries in the new data records, which may be incomplete, missing, or not required. The server 104 may remove the new data records, which may have missing or incomplete data fields. The server 104 may execute one or more protocols to identify the new data records having a common property. The server 104 may aggregate the new data records having the common property, such as, a same type of insurance policy.

The server 104 may transform the new data records to remove any errors prior to loading the data tables of the temporary database 108 with the new data records. The server 104 may execute one or more transformation algorithms on portions or all of the new data records. The transformation algorithms may be computer files. The server 104 may generate transformed new data records on execution of the transformation algorithms. The server 104 may dynamically populate the data tables of the temporary database 108 with the transformed new data records.

The server 104 may reconstruct the new data records into a common data model format prior to loading the data tables of the temporary database 108 with the new data records. The server 104 may execute a standardization algorithm on the new data records to convert all different formats into a single common format. For example, a first new data record may include currency information referred by letters (U.S. dollars) and a second new data record may include currency information referred by symbols ($). On application of the standardization algorithm, the currency information in all the processed new data records may be converted into letters (U.S. dollars).

The server 104 may identify multiple data fields within the new data records prior to loading the data tables of the temporary database 108 with the new data records. The various data fields may contain information associated with sources of the new data records and property of the new data records. Non-limiting examples of the sources of the new data records may include websites, external databases, and government agencies. Non-limiting examples of the property of the new data records may include information associated with a type of the new data record, a category of the new data record, and a type of product associated with the new data record. The server 104 may compare certain fields of two or more inbound new data records being transmitted from disparate data sources 102, to determine whether the two or more inbound new data records are related to the same property and/or the same source. The server 104 may group the new data records that have same property or the same source or both. The server 104 may store each group of new data records in a local memory.

The server 104 may associate each unique set of new data records to a corresponding data table or column in the data tables of the temporary database 108, based on data fields in the set of new data records. Each column in the data tables of the temporary database 108 is configured to store a specific set of summarized new data records. The server 104 may then transmit each new data record into the corresponding column in the data tables of the temporary database 108. For example, a first column in the data tables of the temporary database 108 may store the data records that are associated with a first insurance product (e.g., house insurance), and a second column in the data tables of the temporary database 108 may store the data records that are associated with a specific year (e.g., 2017). A first data record may be associated with the house insurance policy for year 2017. A second data record may be associated with the house insurance policy for the year 2010. In this example, the server 104 may process information associated with the first data record and the second data record. The server 104 may then transmit both the first data record and the second data record into the first column as both the first data record and the second data record are associated with the first insurance product. The server 104 may only transmit the first data record into the second column as only the first data record is associated with year 2017.

The server 104 may generate and execute mapping algorithms, which may enable automatic mapping of any new data records into corresponding columns in the data tables of the temporary database 108. The mapping algorithms may associate features and properties associated with the data records and the columns in the data tables of the temporary database 108. When the data sources 102 generate the new data records, the server 104 may automatically perform cross-referencing and correlation of the new data records among each other. Then, the server 104 may automatically categorize the new data records. The categorization process may automatically trigger execution of the mapping algorithm as it may indicate that new data records have arrived. The columns in the data tables of the temporary database 108 are then automatically populated with corresponding unique new data records. The various columns of the data tables of the temporary database 108 may store the organized, summarized, consolidated, categorized, and synthesized new data records.

The server 104 may process a set of data records (for example, old or existing data records) stored in the data tables of the target database 106 prior to data transfer process. The server 104 may determine identify one or more dependency relationship attributes among a plurality of data records within the set of data records stored in the data tables of the target database 106. The one or more dependency relationship attributes may indicate that the plurality of data records within the set of data records are dependent on each other. For example, the set of data records may include a first data record, a second data record, a third data record, a fourth data record, and a fifth data record. The second data record may be directly dependent on the first data record. The third data record may be directly dependent on the second data record and indirectly dependent on the first data record. When the server 104 may process information associated with the first data record, the second data record, the third data record, the fourth data record, and the fifth data record, the server 104 may determine that the first data record, the second data record, and the third data record may be dependent on each other. The server 104 may further determine that the fourth data record and the fifth data record are independent data records.

The server 104 may process information associated with the new data records stored within the data tables of the temporary database 108 to determine whether there is any new data associated with the dependent data records (for example, the first data record, the second data record, and the third data records) stored within the data tables of the temporary database 108 and/or the target database 106. When the server 104 may identify that the new data records stored within the data tables of the temporary database 108 may include the new data associated with the first data record, the second data record, and the third data record, the server 104 may then merge the new data associated with the first data record, the second data record, and the third data record stored within the data tables of the temporary database 108 with the existing data associated with the first data record, the second data record, and the third data record stored in the data tables of the target database 106.

The server 104 may execute a merging algorithm to perform merging of the new data associated with the first data record, the second data record, and the third data record stored within the data tables of the temporary database 108 and the existing data associated with the first data record, the second data record, and the third data record stored in the data tables of the target database 106. The server 104 may execute the merging algorithm upon a trigger condition. The trigger condition may occur based on predetermined criteria. The predetermined criteria may be a predetermined time period. The merging process may include comparing existing data associated with the first data record, the second data record, and the third data record stored in the data tables of the target database 106 with the new data associated with the first data record, the second data record, and the third data record stored within the data tables of the temporary database 108, and then updating the target database 106 to include the new data associated with the first data record, the second data record, and the third data record. When the merging process is completed, the target database 106 may include both the old data records and the new data records. In one example, when the merging process is completed, the first data record, the second data record, and the third data record stored in the data tables of the target database 106 may include both old data (present within the first data record, the second data record, and the third data record prior to the merging process) as well as newly added data.

The server 104 may monitor (e.g., keep a log) of the new data records being added into the target database 106 in multiple ways. The server 104 may record time stamps of when the new data records present within the temporary database 108 are being merged into the target database 106. The server 104 may record information, such as, added by, added date time, updated by, and updated data time when the new data records from the temporary database 108 are being added into the target database 106. The server 104 may further record information associated with names of the data tables within the target database 106 into which the new data records are being added. The server 104 may store the log information in a local memory for further processing.

The server 104 may retrieve the data records from the target database 106 at any time on receiving a query from the user devices 110 and present the data records on a user interface of the user devices 110. In response to the query, the server 104 may retrieve and process the data records to generate dynamic reports. For instance, the user devices 110 may generate the query using a software application and the query is transmitted to the server 104. The server 104 may parse the target database 106 to collect the data records associated with the query. The server 104 may generate the reports using the collected data records and other factors and variables associated with the query. The server 104 may execute a predetermined protocol that uses a predetermined algorithm to generate the report using the variables. Since the data records may be pre-summarized and stored in the target database 106, the server 104 is able to quickly generate the dynamic report using the organized, summarized, consolidated, categorized, and synthesized data records as a very small amount of time is required in identifying the relevant data records.

The server 104 may use a weighted combination of the variables to generate the report. The weighted combination may be applied based on one or more rules associated with the predetermined protocol. The report may include values of first client insurance products, and its comparison with values of other client insurance products. The values in the report may not be a static value because the server 104 may dynamically update the values in real time. The server 104 may iteratively and dynamically update the values in the report, based on a change of values in the data records in the target database 106. For instance, the server 104 may update the values for the report when new data sources 102 are added or updated as the new data sources 102 may provide new information associated with the query. The server 104 may continuously update the values in the report by iteratively querying different conditions affecting the values, and recalculating the values. The server 104 may dynamically update an interactive graphical user interface of the user devices 110 to reflect the latest values in the report presented on the interactive graphical user interface.

User devices 110 may be computing devices, which may include a processing unit. The processing unit may execute a web browser application to access or receive data records stored in the target database 106. The processing unit may include a processor with a computer-readable medium, such as a random access memory coupled to the processor. The user devices 110 may be running algorithms or computer executable program instructions, which may be executed by a single processor or multiple processors in a distributed configuration. The user devices 110 may be configured to interact with one or more software modules of a same or different type operating within the system 100.

Non-limiting examples of the processor may include a microprocessor, an application specific integrated circuit, and a field programmable object array, among others. The user devices 110 may include a first user device 110*a* and a second user device 110*b*. Non-limiting examples of the user devices 110 may include a server computer, a workstation computer, a tablet device, and a mobile device (e.g., smartphone, PDA). The user devices 110 may be operated by users of a company. The users may be employees of the company. The users may be customers of the company.

The user devices 110 may include an interactive graphical user interface on which the users, such as, the customers of the company may interact by means of an input device, such as a touch screen, a mouse, a keyboard, a keypad, and others. The interactive graphical user interface may collect the data records from the target database 106, and feed the data records to the user.

The user devices 110 may provide the interactive graphical user interface to the users to interact with a software application hosted by the company. In some cases, the user devices 110 may provide the interactive graphical user interface to the users to interact with a customer-centric website hosted by a webserver of the company. The user devices 110 may execute an Internet browser or a local software application, which may access the webserver, in order to issue requests or instructions to the server 104 to access or query the data records from the target database 106.

The user devices 110 may execute a client-side software application, running on an operating system of the user devices 110, for receiving and manipulating the data records stored in the target database 106. The software application may display interactive icons or buttons on the graphical user interface. The triggering of the icons may generate a screen having a plurality of portions on the interactive interface. A first portion of the screen may present a questionnaire associated with various questions related to various products of the company. The users may select a particular product for which the users may need a report. The users may submit answers to the questions related to the selected product. A second portion of the screen may provide a brief text box (for example, a text box with a pre-defined number of characters) having an expandable text capture capability to capture the explanation of the request. The text box may include pre-filled selections identifying common requests for the users to drag and select. The text box may include pre-filled request selections with a processor moving the most likely requests to a top of a list of options based on the analysis of the previous requests by different users. The processor may continually learn and assess using information associated with the previous requests of the users.

The users may submit the request and other information associated with request on the interactive graphical user interface of the user devices 110. The user devices 110 may then issue queries or instructions to the server 104 via the webpages generated by the webserver, which may instruct the server 104 to perform various tasks based on the request, such as retrieving a particular set of data records from the target database 106 or allowing access to the user devices 110 to view the particular set of data records in the target database 106.

In operation, the methods and systems disclosed herein allow data to be transferred/merged from the data sources 102 to the target database 106. The server 104 may generate the temporary database 108 (sometimes refer to as the work data repository) with a similar configuration as the target database 106. The server 104 may then transmit the data to the temporary database 108. When the data is stored within temporary database 108, the server 104 may perform the needed data transformation operations (e.g., transforming the data into a desired data format or into a data format consistent with the target database 106). The server 104 can also retrieve related data records from the target database 106 and/or the data sources 102. The server 104 may store the retrieved data records onto the temporary database 108 to support the data transformation operations. The server 104 may also execute dependency identification protocols and identify whether the data stored within the temporary database 108 has any related data records. The server 104 may then merge the data stored within the temporary database 108 with the data stored within the target database 106.

Figure 2:
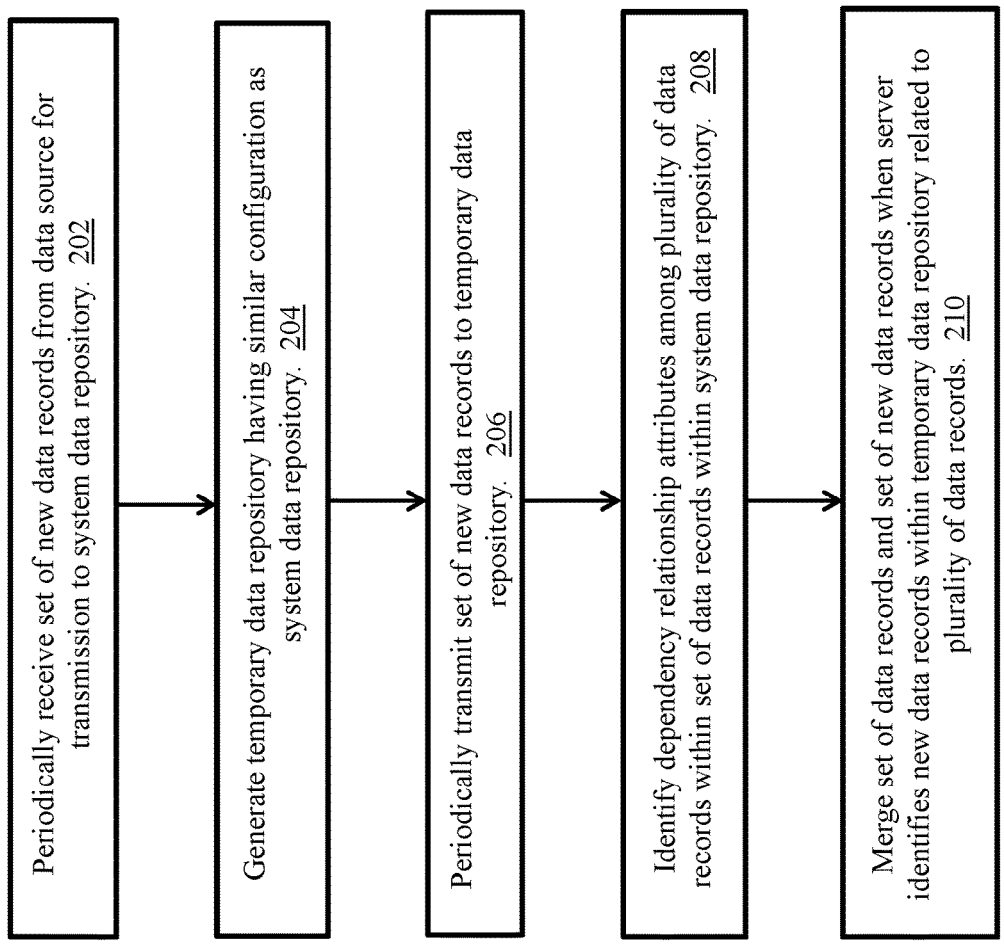
FIG. 2 shows a method for transfer of data from one or more data sources to one or more target databases, according to an embodiment.

FIG. 2 shows execution steps for transfer of data from data sources to a target databases, according to a method 200. The method 200 shown in FIG. 2 may include execution steps 202, 204, 206, 208, and 210. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 200 of the FIG. 2 is described as being executed by a server computer in this embodiment. The server computer executing one or more steps may be programmed to execute various other, unrelated essential features. The steps may also be executed by a plurality of server computing devices operating in a distributed computing environment.

In step 202, a server may periodically receive a set of new data records from the data sources for transmission to the target databases. The target databases may include at least one target data repository. The target data repository may include one or more data tables, which may store a set of data records. The one or more data tables of the target data repository may have a first configuration. The first configuration of the one or more data tables of the target data repository may include a first size of each data table, a first type of each data table, etc.

The server may handle the set of new data records based at least in part by configuring data generation devices of the data sources to subscribe to a data feed of the set of new data records. The data feed may be adapted to collect the set of new data records in various data formats from the data sources. The set of new data records may contain information selected from a group including, but not limited to, customer records, marketing records, sales records, bank records, insurance records, fixed income records, financing records, equities records, and foreign currency records.

The server may execute a scanning protocol or a crawling protocol to periodically retrieve the set of new data records from the data sources. The server may periodically retrieve the set of new data records from the data sources after a predetermined period of time. The data sources may include the data generation devices, which may generate the set of new data records according to one or more data models associated with one or more formats and one or more data types. Each data generation device may generate a corresponding new data record according to a separate type of data model having a separate data type and a separate data format.

The server may standardize or normalize the set of new data records received from the data generation devices according to a common data model. The common data model may be selected by an administrator device. The administrator device may select the common data model based on a configuration of a temporary data repository. The administrator device may select the common data model based on a configuration of the target data repository. The server may standardize the set of new data records having the one or more formats and the one or more data types by converting the formats for the set of new data records having all the data types to a single format and single data type. As a result, when data is stored onto the target data repository/database, the data is arranged in accordance with a uniform data format.

The server may parse the set of new data records to identify unique properties associated with the set of new data records (e.g., data record attributes). The properties of the set of new data records may include different types of the new data records. Non-limiting examples of the properties of the set of new data records may include the new data records based on clients, insurance policy, and geography. The server may assign an identifier to each data property in the set of new data records. In one instance, the server may assign a first identifier to each data record associated with a first province and a second identifier to each data record associated with a second province. In another instance, the server may assign a third identifier to each data record associated with a first insurance policy and a fourth identifier to each data record associated with a second insurance policy.

In step 204, the server may generate the temporary data repository. The temporary data repository may have a similar configuration as the target data repository. The temporary data repository may include one or more data tables that may have the first configuration. The first configuration of the one or more data tables of the temporary data repository may include the first size of each data table, the first type of each data table, etc. The temporary data repository may be a cloud storage or a third-party storage application that could replicate the data repository.

In step 206, the server may periodically process and transmit the set of new data records from the data sources to the one or more data tables of the temporary data repository. The one or more data tables of the temporary data repository may be one or more multi-dimensional data tables. The server may generate and execute mapping algorithms, which may enable automatic mapping of the set of new data records into the data tables of the temporary data repository. The mapping algorithms may associate features and properties associated with the set of new data records and the data tables of the temporary data repository. When the data sources may generate the set of new data records, the server may automatically perform cross-referencing and correlation of the set of new data records among each other. Then, the server may automatically categorize the set of new data records.

The categorization process may automatically trigger execution of the mapping algorithm as it may indicate that set of new data records have arrived. The data tables of the temporary data repository are then automatically populated with corresponding set of new data records. The data tables of the temporary data repository may store the organized, summarized, consolidated, categorized, and synthesized set of new data records.

In step 208, the server may process the set of data records (for example, old or existing data records) stored in the data tables of the target data repository prior to data transfer process. The server may determine identify one or more dependency relationship attributes among a plurality of data records within the set of data records stored in the data tables of the target data repository. The one or more dependency relationship attributes may indicate that the plurality of data records within the set of data records are dependent on each other. For example, the set of data records may include a first data record, a second data record, a third data record, a fourth data record, and a fifth data record. The second data record may be directly dependent on the first data record. The third data record may be directly dependent on the second data record and indirectly dependent on the first data record. When the server may process information associated with the first data record, the second data record, the third data record, the fourth data record, and the fifth data record, the server may determine that the first data record, the second data record, and the third data record may be dependent on each other.

In step 210, the server may merge the set of data records and the set of new data records when the server may determine that one or more new data records within the set of new data records stored in the temporary data repository may be related to the plurality of data records. For example, the server may process information associated with the set of new data records stored within the data tables of the temporary data repository to determine whether there is any new data associated with the dependent data records (for example, the first data record, the second data record, and the third data records) stored within the data tables of the target data repository.

When the server identifies that the set of new data records stored within the data tables of the temporary data repository may include the new data associated with the first data record, the second data record, and the third data record, the server may then merge the new data associated with the first data record, the second data record, and the third data record stored within the data tables of the temporary data repository with the existing data associated with the first data record, the second data record, and the third data record stored in the data tables of the target data repository. The server may execute a merging algorithm to perform merging of the new data associated with the first data record, the second data record, and the third data record stored within the data tables of the temporary data repository and the existing data associated with the first data record, the second data record, and the third data record stored in the data tables of the target data repository. When the merging process is completed, the target data repository may include both the old data records and the new data records.

Non-Limiting Example

In a non-limiting example, a server may receive an instruction to transfer data tables 1-5 from a first database to a second database. The server first generates a temporary data repository that replicates the second database. The server then identifies that the first database already includes data tables 1-5. The server then executes a data dependency identification protocol to identify how (if any) the data tables 1-5 are related and updates the temporary data repository accordingly. For instance, the server identifies the following dependencies:

TABLE 1

| Data Table | Dependency |
|---|---|
| 1 | N/A |
| 2 | 1 |
| 3 | N/A |
| 4 | 2 |
| 5 | 4 |

The server then transfers the new data tables from the second database to the temporary data repository. In some embodiments, the server may directly transfer the new data tables for which no dependencies have been identified to the second database. For instance, the server may transfer data table 3 directly into the second database. The server may perform this process in parallel to transferring other data tables to the temporary data repository. Once the server identifies that all data and their corresponding dependent data tables have been uploaded into the temporary data repository, the server then transfers the data from the data repository into the second database in batches. For instance, the server may first transfer data table 3 to the second database.

The server then does not transfer data tables 1, 4 or 5 until and unless data table one and two have been transferred to the second database. In some embodiments, the server may simultaneously transfer data tables 1, 2, 4, and 5 to the second database. The server may designate the second database as offline and transfer data tables 1, 2, 4, and 5 in a batch. In this way, the second database is only offline for a minimal amount of time, which improves user experience and conventional data transfer methods. As a result of the above-described data transfer method, various applications using data stored within the data tables 2, 4, and/or 5 will have access to the latest data.

In some embodiments, the server may receive a request to revert to a previous version of data (e.g., data before the transfer). This may be due to data corruption and/or user preferences. Conventional methods require the server transferring the data to generate a backup storage. When the server receives instructions to revert to a previous version, the server may access the backup data stored and may revert to the previous version by replacing the data within the data repository with the appropriate backed up data separately stored. These conventional methods require heavy computing resources to review and replace data upon receiving instructions. These conventional methods also require storage of previous versions of data that could be costly. The method 300 allows a server to efficiently revert to a previous version of data without requiring high computing resources or storage of all previous data.

Figure 3:
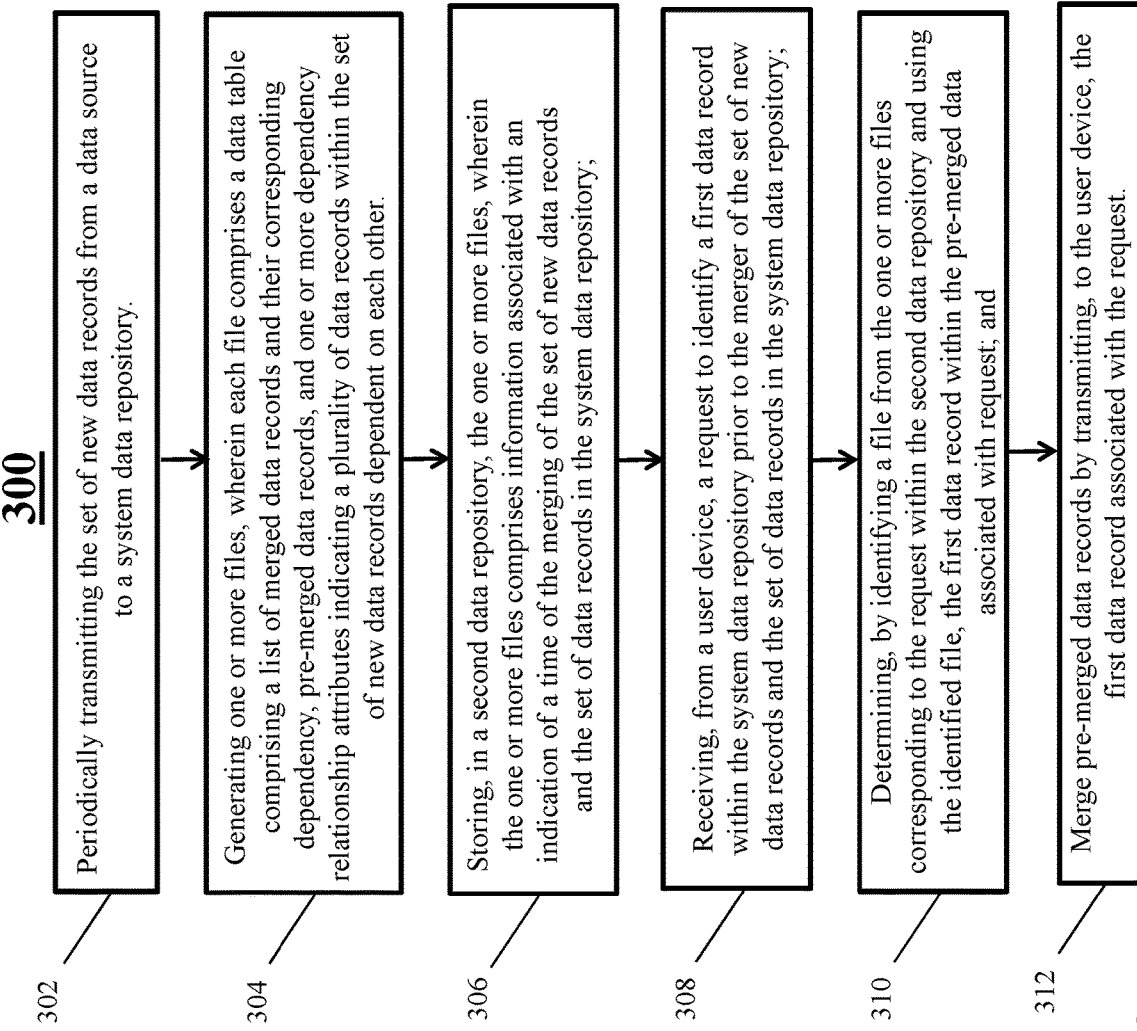
FIG. 3 shows a method for transfer of data from one or more data sources to one or more target databases, according to an embodiment.

FIG. 3 shows execution steps for transfer of data from data sources to a target databases, according to a method 300. The method 300 may include execution steps 302, 304, 306, 308, 310, and 312. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 300 is described as being executed by a server computer in this embodiment. The server computer executing one or more steps may be programmed to execute various other, unrelated essential features. The steps may also be executed by a plurality of server computing devices operating in a distributed computing environment.

In step 302, the server may periodically merge a set of new data records by transmitting the set of new data records from one or more data sources to a target data repository, wherein the target data repository comprises a set of data records.

The server may merge data stored within one or more data repositories using the methods and systems described above. For instance, the server may transmit data using the incremental method described above in FIGS. 1-2. Even though aspects of this disclosure use the incremental data transfer method as an example, it is expressly understood that the methods and systems described here, e.g., in the method 300, can be applied to any data transfer method and/or system. For instance, the method 300 may be applied to a conventional data transfer between two databases.

In step 304, for each time the server merges the set of new data records and the set of data records in the target data repository, the server may generate one or more files, wherein each file comprises a data table comprising a list of merged data records and their corresponding dependency, pre-merged data records, post-merged data records, and one or more dependency relationship attributes indicating a plurality of data records within the set of new data records dependent on each other.

Each time the server transmits data from one or more data sources to a data repository (e.g., updating data tables within a database to a new version using data received from one or more databases). The server generates one or more files having at least one table indicating data associated with the merging and updating the data within the data repository. Each file may contain multiple data tables where each data table may refer to updating of one or more data records or data tables within the data repository. The file may represent an inventory of changes for each data transfer.

Referring now to FIG. 4, a non-limiting example of a file having different data tables identifying attributes of a batch update of different data tables/records is illustrated. In this non-limiting example 400, the server executes a batch 5 in which it replaces batch 4 (e.g., version 4) with new data (e.g., batch 5). Therefore, the data table 402 represents a new version of data that is being uploaded into a database. Moreover, table 404, displays the data as stored within the database (e.g., data before the batch 5 update or version 4 of the data that is currently stored within the database). Therefore, table 404 may be a replica of the database and how it stores data. One skilled in the relevant art will recognize that the data tables illustrated in FIG. 4 only depict a portion of data records for simplicity and ease of understanding.

In the tables illustrated in FIG. 4, primary key (PK) column represents a specific data table within the database. For instance, data stored onto PK1 refer to different data records within data table 1. As depicted batch 4 (before the server updates the database using batch 5 data) includes PK1-5. However, batch 5 (table 402) includes PK6. This indicates that batch 5 includes a new data table (or primary key) that did not exist in the database before. Data stored within each PK may also correspond to an audit ID and an updated audit ID. These indicators may be used to identify data and their corresponding data. As depicted in table 404, PK 1 has a field (e.g., data record) of 100 and PK5 has a field of 500. In contrast, the new version of the data has PK1 with a field value of 10000 and a PK 5 with a field value of 2000. When the server merges the data by transmitting batch 5 (table 402), the database is represented by table 406. Therefore, table 406 represents the database after the merging and includes all updated values.

The server then also creates the table 408 that includes the differences between batch 4 and batch 5. For instance, data table 408 indicates that PK1 and PK2 had field values of 100 and 500 respectively. Table 408 also indicates the audit ID values for PK1 and PK5. The server may not include the PKs within the database that were not updated as a result of the data merger. For instance, the table 408 may not include PK2-4 because these PKs were not updated by batch 5. Furthermore, table 408 may also not include PK6 because PK6 was not updated in batch 5. Indeed, PK6 was added as new data in batch 5. Therefore, PK6 is the only existing (and primary version) of the data.

The server may store the table 408 in a separate or temporary data repository. In some embodiments, the server may store the table 408 within the data repository (e.g., database) as well. The table 408 may also include any additional files updated or modified in batch 5. The server may generate a data table representing the difference (delta) for later recovery of data each time the server updates the database. Therefore, the server may generate as many delta data tables as the number of updates for a particular database.

Referring back to FIG. 3, in step 306, the server may store, in a second data repository, the one or more files, wherein the one or more files comprises information associated with an indication of a time of the merging of the set of new data records and the set of data records in the target data repository.

The server may store the files generated at step 304 within the second data repository. In some other configurations, the server may store the files generated in a separate data repository. For instance, the server may store the files in a third party or a temporary data storage, such as a cloud storage unit.

In step 308, the server may receive, from a user device, a request to identify a first data record within the target data repository prior to the merger of the set of new data records and the set of data records in the target data repository. The server may receive an instruction to revert the data back to a previous version. For instance, after transmitting data into a database, the server may receive an instruction to revert the data back to the previous version. In some embodiments, the server may receive a request to revert all or part of the data back to its previous version.

In step 310, the server may identify a file from the one or more files corresponding to the request within the second data repository. The server may also determine, using the identified file, the first data record within the pre-merged data associated with request. The server may identify the file (generated when updating the data and described in step 304 that corresponds to the request received in step 308. The server may then identify the corresponding data records (or data tables) that has changed. In this way, the server identifies which data records have changed because of the merger.

In step 312, the server may transmit, to the user device, the first data record associated with the request. The server may transmit the data corresponding to the identified changes (step 310) to one or more computing devices including the computing device transmitting the request to the server. The server may also replace the one or more data record within the database with the identified data record (step 310). In that way, the database may include data that represents a previous version of data.

Non-Limiting Example

A server periodically merges data within a database. The server receives an indication that the data currently stored within the database (version 7) is corrupt. The server also receives an instruction to revert the data back to its previous version (version 6). The server first queries and retrieves (from a separate data repository, such as cloud storage) merging data tables created at the time of merging the data (e.g., from version 6 to version 7). The server retrieves data tables 502-508, depicted in FIG. 5 (example 500). These data tables may be stored within any data repository such as the persistent database and/or the temporary database.

The data table 502 illustrates version 7 update of the data. As depicted in data table 502, the server updated PK3-5 as version 7 update of the data stored within the database. The table 504 illustrates the previous version of data (e.g., version 6). When the server merged the data, the server created table 506 that illustrates the data, as it is currently stored within the database. The server also retrieves data table 508 that illustrates the differences between version 6 and version 7.

When the server receives the instruction to revert the data back to version 6, the server identifies the appropriate data table to retrieve (tables 502-508). The server then uses the data table 508 to identify which specific data records have been modified. As depicted, the server identifies that PK3 and PK4 need to be reverted. As a result, the server retrieves version 6 of PK3 and PK4 and re-merges the data stored within the database. Therefore, the data stored within the database may become a combination of version 6 and version 7. For instance, PK3-4 may be reverted to version 6 while PK1-2 may remain version 7. The data tables illustrated in FIG. 5 also include an indication regarding whether a data record is restricted. A "restricted_row_ind" may enable the server to implement the row level security in a database management system.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the methods and embodiments described herein. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method for incremental data transfer from a data source to a target data repository comprising:
    generating, by a processor, a temporary data repository, wherein the temporary data repository has a similar configuration as the target data repository;
    transmitting, by the processor, a set of new data records from the data source to the temporary data repository instead of the target data repository; and
    when the processor identifies that a predetermined number of data records and their respective dependent data records are stored within the temporary data repository, merging, by the processor, a set of data records within the target data repository and the set of new data records.

2. The method of claim 1, wherein the processor identifies that the predetermined number of data records and their respective dependent data records are stored within the temporary data repository based on identifying one or more dependency relationship attributes among a plurality of data records within the set of data records stored within the target data repository.

3. The method of claim 1, further comprising:
normalizing, by the processor, the set of new data records received from the data source according to a common data model.

4. The method of claim 3, wherein the common data model is selected based on a configuration of the temporary data repository.

5. The method of claim 3, wherein the common data model is selected based on a configuration of the target data repository.

6. The method of claim 1, further comprising:
converting, by the processor, a plurality of data types associated with the set of new data records to a single data type.

7. The method of claim 1, further comprising:
converting, by the processor, a plurality of formats associated with the set of new data records to a single format.

8. The method of claim 1, further comprising:
receiving, by the processor, a request from a user device to access the target data repository for retrieving information.

9. The method of claim 8, further comprising:
in response to the request, granting, by the processor, access to the target data repository for retrieving the information.

10. A system for incremental data transfer from a data source to a target data repository comprising:
the data source configured to transmit a set of new data records;
a system repository configured to receive and store the set of new data records;
a server in communication with the data source and the system repository, the server configured to:
generate a temporary data repository, wherein the temporary data repository has a similar configuration as the target data repository;
transmit the set of new data records from the data source to the temporary data repository instead of the target data repository; and
when the processor identifies that a predetermined number of data records and their respective dependent data records are stored within the temporary data repository, merge a set of data records within the target data repository and the set of new data records.

11. A server-implemented method comprising:
merging, by a processor, a set of new data records from a data source to a target data repository, wherein the target data repository comprises a set of data records;
generating, by the processor, a data table comprising a list of merged data records and their corresponding pre-merged data records and a dependency relationship attributes indicating a plurality of data records within the set of new data records dependent on each other;
receiving, by the processor, a request to identify a first data record within the target data repository prior to merging of the set of new data records and the set of data records in the target data repository;
determining, by the processor using the data table, the first data record within pre-merged data associated with the request; and
merging, by the processor, pre-merged data records with the target data repository by transmitting, by the processor, the first data record associated with the request.

12. The method of claim 11, wherein the data table comprises information associated with an indication of a time of the merging of the set of new data records and the set of data records in the target data repository.

13. The method of claim 11, further comprising:
generating, by the processor, a temporary data repository, wherein the temporary data repository has a similar configuration as the target data repository.

14. The method of claim 13, further comprising:
transmitting, by the processor, the set of new data records from the data source to the temporary data repository.

15. The method of claim 14, further comprising:
identifying, by the processor, one or more dependency relationship attributes among the plurality of data records within the set of data records stored within the target data repository, the one or more dependency relationship attributes indicating that the plurality of data records are dependent on each other.

16. The method of claim 15, further comprising:
when the processor identifies one or more new data records within the set of new data records stored in the temporary data repository related to the plurality of data records, merging, by the processor, the set of data records and the set of new data records.

17. The method of claim 11, wherein the pre-merged data records comprises the set of data records within the target data repository.

18. The method of claim 11, wherein a post-merged data records comprises the set of new data records and the set of data records in the target data repository.

19. The method of claim 11, wherein the target data repository comprises a plurality of data tables, wherein the plurality of data tables of the target data repository are arranged in a first configuration.

20. The method of claim 13, wherein the temporary data repository comprises a plurality of data tables, wherein the plurality of data tables of the temporary data repository are arranged in accordance with a configuration of the target data repository.

* * * * *